United States Patent
Hu et al.

(10) Patent No.: US 8,276,382 B2
(45) Date of Patent: Oct. 2, 2012

(54) SYSTEMS AND METHODS FOR PRE-WARMING A HEAT RECOVERY STEAM GENERATOR AND ASSOCIATED STEAM LINES

(75) Inventors: Tailai Hu, Greenville, SC (US); Kelvin R. Estrada, Norcross, GA (US); Michael Joseph Alexander, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 846 days.

(21) Appl. No.: 12/405,561

(22) Filed: Mar. 17, 2009

(65) Prior Publication Data

US 2010/0236240 A1   Sep. 23, 2010

(51) Int. Cl.
*F01K 13/02* (2006.01)
(52) U.S. Cl. ............... 60/646; 60/657; 60/679; 60/653
(58) Field of Classification Search ............ 60/646, 60/657–658, 677–679, 653
See application file for complete search history.

(56) References Cited

U.S. PATENT DOCUMENTS

| | | | |
|---|---|---|---|
| 3,220,193 A * | 11/1965 | Strohmeyer, Jr. | 60/659 |
| 4,487,166 A * | 12/1984 | Haller et al. | 122/406.5 |
| 5,412,936 A | 5/1995 | Lee et al. | |
| 5,435,138 A * | 7/1995 | Silvestri, Jr. | 60/652 |
| 5,473,898 A | 12/1995 | Briesch | |
| 6,782,703 B2 | 8/2004 | Dovali-Solis | |
| 2004/0013511 A1 | 1/2004 | Brackenhammer et al. | |
| 2009/0126338 A1 * | 5/2009 | Kitaguchi | 60/39.182 |

* cited by examiner

*Primary Examiner* — Hoang Nguyen
(74) *Attorney, Agent, or Firm* — Sutherland Asbill & Brennan LLP

(57) ABSTRACT

Embodiments of the invention can provide systems and methods for pre-warming a heat recovery steam generator and associated steam lines. According to one embodiment, a method for pre-warming a heat recovery steam generator can be provided. The method can include providing heating steam from a steam source. The heating steam is directed from the steam source to a superheater so that at least a portion of the superheater can be warmed. Once exiting the superheater, the heating steam can be further directed from the superheater to at least one bypass line and maintained in the bypass line until the bypass line attains a predefined temperature or pressure. Furthermore, the method can include directing, after the bypass line attains a predefined temperature or pressure, at least a portion of the heating steam from the bypass line to a reheater so that the reheater can be warmed.

20 Claims, 3 Drawing Sheets

SYSTEMS AND METHODS FOR PRE-WARMING A HEAT RECOVERY STEAM GENERATOR AND ASSOCIATED STEAM LINES

FIELD OF THE INVENTION

The invention relates to a combined cycle power plant, and more specifically to systems and methods for providing systems and methods for pre-warming a heat recovery steam generator and associated steam lines.

BACKGROUND OF THE INVENTION

A combined cycle power plant can use a combination of a gas turbine and a steam turbine to produce electrical power. In a combined cycle power plant, a gas turbine cycle can be operatively combined with a steam turbine cycle by way of a heat recovery steam generator ("HRSG").

In a combined cycle power plant, the gas turbine cycle can be referred to as a topping cycle, and the steam turbine cycle can be referred to as a steam bottoming cycle. Since the steam turbine or bottoming cycle is driven by heat from the exhaust of the gas turbine or topping cycle, the HRSG does not, in some instances, become fully operational until the gas turbine or topping cycle has increased the steam turbine or bottoming cycle to a suitable temperature.

For example, during start-up of the gas turbine or topping cycle, there is a relatively rapid increase in the flow rate of the hot gas exhaust from the gas turbine as the turbine accelerates to operating speed. At this point, the temperature of the exhaust gas gradually increases as the firing temperature of the gas turbine is increased and managed at a suitable level to produce a desired power output.

Although the hot exhaust gas from the gas turbine typically flows through the HRSG during the gas turbine start-up, a considerable period of time can elapse before an initially cold HRSG is capable of generating steam at sufficient pressure and temperature. In conventional systems, the gas turbine or topping cycle was kept at a relatively low load until the temperature of the HRSG increased to a level where the HRSG could generate steam at a desired pressure and temperature. By maintaining the topping cycle at a low load for an extended period of time, the steam passing to the steam turbine could be controlled at a temperature and pressure that would reduce stresses on the cold steam turbine metal and component parts. When the topping cycle was not maintained at a low load for this warm-up phase, the steam turbine or bottoming cycle was subjected to stresses that reduced its operational life. Parts fatigue, casing and shaft distortions, and physical deterioration of the HRSG system's seals and blades are just some examples of the damage these stresses can cause. In contrast, operating the gas turbine or topping cycle at a relatively low load can reduce these stresses and corresponding damage. Doing so, however, can reduce the combined cycle system's overall power output, leads to inefficiency, and increases emissions.

Consequently, there is a need for systems and methods for pre-warming a HRSG and associated steam lines. Furthermore, there is a need for systems and methods for pre-warming a HRSG and associated steam lines in multiple state conditions, such as cold, warm, and hot conditions.

BRIEF DESCRIPTION OF THE INVENTION

Embodiments of the invention can address some or all of the needs described above. Certain embodiments of the invention are directed generally to systems and methods for pre-warming a heat recovery steam generator ("HRSG") and associated steam lines. Certain other embodiments of the invention are directed to systems and methods for pre-warming a superheater, a reheater, multiple stages of a steam turbine, and/or a high pressure evaporator and drum. According to one embodiment, a method for pre-warming a HRSG can be provided. The method can include providing heating steam from a steam source. The method can also include directing the heating steam from the steam source to a superheater to warm at least a portion of the superheater. In addition, the method can include directing at least a portion of the heating steam from the superheater to at least one bypass line and maintaining it in the bypass line until a predefined temperature or pressure is attained. Furthermore, the method can include directing at least a portion of the heating steam, once the bypass line attains a predefined temperature or pressure, from the bypass line to a reheater so that the reheater can be warmed.

According to another embodiment of the invention, a system for pre-warming a HRSG can be provided. The system can include a steam source for providing heating steam. The system can also include at least one steam line connected to the steam source and a superheater for directing heating steam from the steam source to the superheater. The system can further include at least one steam line connected to the superheater and at least one bypass line for directing at least a portion of the heating steam from the heating steam to the at least one bypass line. The system can also include a controller connected to the at least one bypass line for maintaining at least a portion of the heating steam in the at least one bypass line at a predefined temperature or pressure. Moreover, the system can include at least one steam line connected to the bypass line and a reheater for directing at least a portion of the heating steam at the predefined temperature or pressure from the at least one bypass line to the reheater.

According to yet another embodiment of the invention, a method for pre-warming a HRSG can be provided. The method can include providing heating steam from a steam source. The method can also include directing the heating steam from the steam source to a superheater to warm at least a portion of the superheater. The method can further include directing at least a portion of the heating steam from the steam source to a high pressure section of a steam turbine to warm at least a portion of the high pressure section of the steam turbine. In addition, the method can include directing at least a portion of the heating steam from the superheater to a reheater, and from the reheater to an intermediate section of the steam turbine. Finally, the heating steam can be directed from the intermediate pressure section of the steam turbine to a low pressure section of the steam turbine to warm the low pressure section of the steam turbine.

Other embodiments and aspects of the invention will become apparent from the following description taken in conjunction with the following drawings.

BRIEF DESCRIPTION OF THE DRAWINGS

Figure 1:
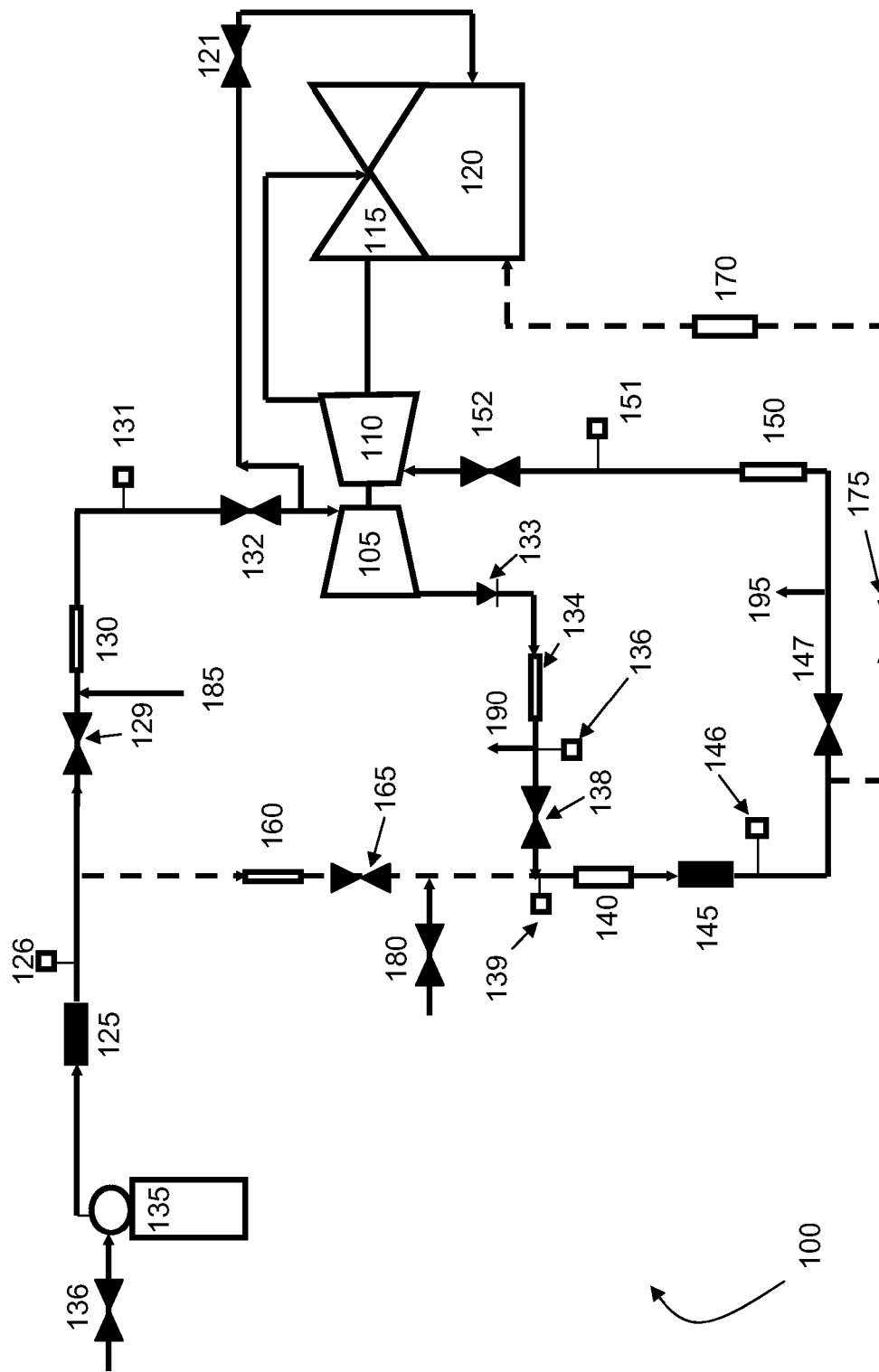

Having thus described the invention in general terms, reference will now be made to the accompanying drawings, which are not necessarily drawn to scale, and wherein:

FIG. 1 illustrates a prior art heat recovery steam generator ("HRSG") system.

Figure 2:
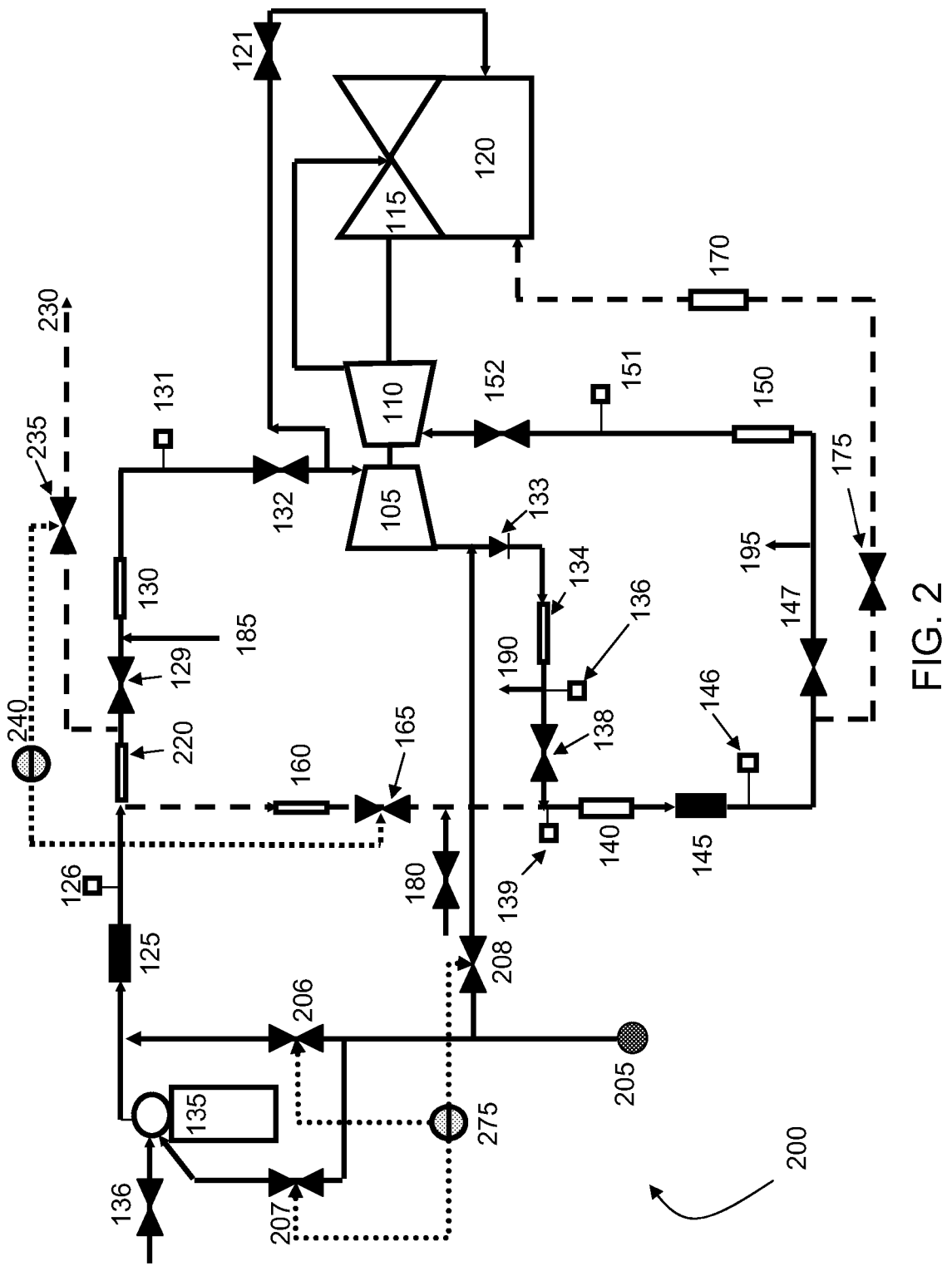

FIG. 2 illustrates an exemplary system for pre-warming a HRSG and associated steam lines according to one embodiment of the invention.

Figure 3:
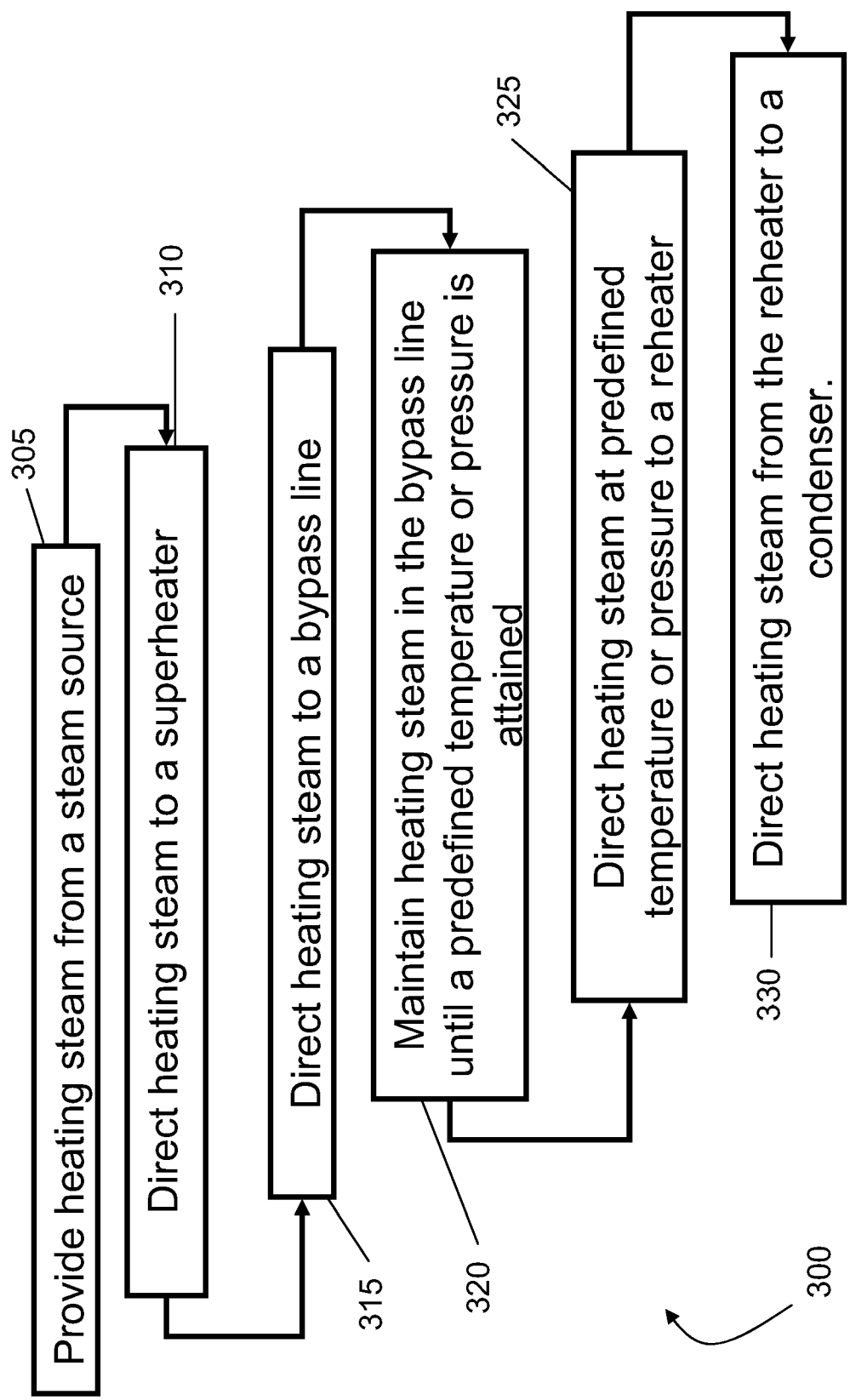

FIG. 3 illustrates an exemplary method for pre-warming a HRSG and associated steam lines according to one embodiment of the invention.

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

FIG. 1 illustrates a conventional heat recovery steam generator ("HRSG") system 100 known in the prior art. In the system 100 shown, steam is cycled through a series of steam turbine stages, including a high pressure stage 105, an intermediate pressure stage 110, and a low pressure stage 115. A condenser 120 is connected to low pressure stage 115 and high pressure stage 105 to collect condensation. Valve 121 connects between the condenser 120 and high pressure stage 105 to control pressure between these two components.

Superheated steam can be provided by a high pressure superheater 125, which directs superheated steam to the high pressure stage 105 via main steam line 130. Drain 126 is available for draining condensate between superheater 125 and main steam line 130. Between main steam line 130 and high pressure superheater 125, valve 129 can control pressure and steam flow between these two components. Valve 132 between main steam line 130 and high pressure stage 105 likewise can control pressure and steam flow between these two components. Drain 131 is available to drain condensate from main steam line 130.

High pressure superheater 125 can receive steam from a high pressure evaporator and drum 135. High pressure evaporator and drum 135 can convert feedwater into steam using hot exhaust gas dispelled by the gas turbine or topping cycle. High pressure superheater 125 can also rely on the gas turbine exhaust gas to convert at least a portion of the steam from high pressure evaporator and drum 135 to superheated steam. In system 100, feedwater control is provided by valve 136.

When superheated steam is directed to high pressure stage 105 from main steam line 130, the superheated steam is converted to mechanical energy by way of an associated shaft. Rotation of the shaft can be used to drive a load, such as an electrical generator. When exiting high pressure stage 105, the steam has lost energy due to the energy conversion. The steam can be reheated before being fed to the intermediate pressure stage 110. As a result, once the exiting steam passes through non-return valve 133, the steam can enter intermediate pressure steam line 134, which is connected to reheat steam line 140. Drain 136 is present for removing condensate from intermediate pressure steam line 134, and valve 138 controls pressure and steam flow between intermediate pressure steam line 134 and reheat steam line 140.

Reheat steam line 140 is connected to reheater 145. Reheater 145 can increase the temperature of the steam and provides the reheated steam to hot reheat steam line 150, which connects reheater 145 with intermediate pressure stage 110. Valve 147 and valve 152 can control pressure and steam flow between these components, and drains 146 and 151 are available for removing condensate from the system 100. As steam exits intermediate pressure stage 110, the steam enters the low pressure stage 115, and as the steam travels through these two stages 110, 115, the associated heat energy is again converted into mechanical energy by way of an associated shaft. Upon exiting the low pressure stage 115, some or all of the residual steam and water, which is the byproduct of the steam conversion, can be collected in condenser 120.

Also present in system 100 is high pressure steam bypass line 160, which connects the outlet of high pressure superheater 125 to reheat steam line 140, and is operable to direct steam from superheater 125 to reheat steam line 140. High pressure steam bypass valve 165 is operable to control the corresponding steam pressure and steam flow in high pressure steam bypass line 160. Hot reheat steam bypass line 170 connects the outlet of reheater 145 to condenser 120 and is operable to direct steam between them. Steam flow and pressure between reheater 145 and condenser 120 can be managed with reheat bypass valve 175. At valve 180 is an inlet for intermediate pressure steam, and at joints 185, 190, and 195 another HRSG system can be integrated with system 100.

Because the steam turbine or bottoming cycle derives mechanical energy from steam and superheated steam, the bottoming cycle components and associated steam lines operate at an extremely high temperature. When not operating, though, the temperatures of these components and steam lines may fall outside a certain operating range. When the system 100 has not been operated for an extended period of time, such as 48 hours or more, it is said to be in a "cold" thermostate condition. If the HRSG system is then turned on immediately such that superheated steam is fed through the cold system to generate power, physical stresses on the components and steam lines will result.

FIG. 2 illustrates an exemplary system 200 according to one embodiment of the invention. Similar to system 100, system 200 includes multiple steam turbine stages designed to produce mechanical energy when steam is introduced to them with different temperatures and different pressures. These turbine stages can include a high pressure stage 105, an intermediate pressure stage 110, and a low pressure stage 115. Connected to low pressure stage 115 and high pressure stage 105 is a condenser 120. Also present in system 200 is high pressure superheater 125, high pressure evaporator and drum 135, reheater 145, and associated steam lines and valves for connecting these component parts. For example, like system 100, main steam line 130 connects high pressure superheater 125 to high pressure stage 105 of the steam turbine or bottoming cycle. Main steam line 130 is operable to direct steam from superheater 125 to high pressure stage 105. Hot reheat steam line 150 connects intermediate pressure stage 110 of the bottoming cycle to reheater 145, and is operable to direct steam from reheater 145 to hot reheat steam line 150. Dispersed among the turbine stages, lines, and components are valves 132, 152, and non-return valve 133 for controlling steam pressure and steam flow, and drains 126, 131, 139, 146, and 151 for removing condensate from the system. When condensate is removed, it can be collected in a storage tank or channeled to condenser 120 for reuse.

Also like system 100, system 200 includes high pressure steam bypass line 160, connecting the outlet of high pressure superheater 125 to reheat steam line 140, and hot reheat steam bypass line 170, connecting the outlet of reheater 145 to condenser 120. Among these elements are similar valves for controlling steam flow, including high pressure steam bypass valve 165 and reheat bypass valve 175.

Unlike system 100, though, system 200 includes at least one steam source 205, which is operable to provide heating steam to system 200 for pre-warming high pressure superheater 125, high pressure evaporator and drum 135, reheater 145, and their associated steam lines. A steam source 205 can be, for example, a boiler, a steam generator, a pressurized water heater, plant steam, or another system for producing steam. Using the heating steam from steam source 205, the bottoming cycle of a HRSG system can be warmed independently of the gas turbine or topping cycle's operation. This independence allows the topping cycle to be operated at any load, including a load equivalent to its maximum continuous power output rating. Moreover, this independence provides the HRSG system a relatively fast start-up capability since the HRSG system can be warmed independently of the gas turbine or topping cycle, and the HRSG system does so while preserving or otherwise minimizing adverse effects on the steam turbine cycle system's operational life as described more fully below.

Other differences between system 100 and system 200 can include any number of steam lines, valves, and associated valve controls for managing the warming steam through the various components of the steam turbine or bottoming cycle. For example, in system 200, the outlet of high pressure superheater 125 is connected to steam line 220, which through isolation valve 129, is connected to main steam line 130. Steam line 220 is operable to direct steam from the outlet of superheater 125 to main steam line 130. Steam line 220 is further operable to direct steam from the outlet of superheater 125 to output steam line 230 when bypass valve 235 is opened. Controller 240 can maintain pressure and steam flow in output steam line 230 and in high pressure steam bypass line 160 through steam bypass valve 165 and bypass valve 235. In the exemplary embodiment, output steam line 230 can be connected to condenser 120, a storage tank, the atmosphere, or another suitable system for collecting steam.

One may recognize the applicability of embodiments of the invention to other environments, contexts, and applications. One will appreciate that components of the system 200 shown in and described with respect to FIG. 2 are provided by way of example only. Numerous other operating environments, system architectures, and device configurations are possible. Accordingly, embodiments of the invention should not be construed as being limited to any particular operating environment, system architecture, or device configuration.

FIG. 3 illustrates an exemplary method 300 for pre-warming a HRSG system and its associated steam lines. The method begins at block 305 where heating steam is provided by a steam source and continues at block 310 by directing the heating steam to a superheater. One embodiment for implementing this exemplary method is exemplary system 200 shown in FIG. 2. For example, when the bottoming cycle of system 200 is below normal operational temperature, heating steam is provided from steam source 205 and is admitted into the high pressure superheater 125 through valve 206 to warm up the superheater tubes. In doing so, superheater 125 can be warmed.

Method 300 continues at block 315 where heating steam is directed from the superheater to a main bypass line connected between the superheater and a reheater. Block 320 maintains the heating steam in the main bypass line until a predefined temperature or pressure is attained. In one embodiment, these blocks are implemented by system 200 with superheater 125, high pressure steam bypass line 160, steam line 220, and steam bypass valve 165. More specifically, after heating steam travels through superheater 125, it is discharged into high pressure steam bypass line 160 and steam line 220 so that these lines can be warmed. Steam bypass valve 165 and valve 235 open and close to let the warming steam into high pressure steam bypass line 160 and output steam line 230. Steam bypass valve 165 and valve 235 can work in conjunction with each other to control the pressure in the respective associated steam lines during the warming period. In one embodiment, each of the valves 165 and 235 can have predefined or otherwise programmed pressure set points, which can be calculated based at least in part on any number of conditions associated with the system 200, such as the initial pressure in high pressure steam bypass line 160, and so on.

In the embodiment shown in FIG. 2, controller 240 can control both steam bypass valve 165 and valve 235, but it should be understood that while only one controller is illustrated in association with only these two valves, any number of controllers and valves in any number of configurations can be used to control the flow of heating steam and to pre-warm the HRSG system and any associated steam lines.

In the exemplary method 300 at block 320, heating steam can be maintained in the bypass line until a predefined temperature or pressure is attained. The method 300 continues at block 325 where heating steam is directed to a reheater after the temperature and pressure in the bypass line have reached the appropriate thresholds. In exemplary system 200, some or all of these blocks can be implemented by high pressure steam bypass line 160, high pressure steam bypass valve 165, reheat steam line 140, and reheater 145. Once the warming steam enters high pressure steam bypass line 160 and steam line 220, these lines will begin to warm to a predefined pressure or temperature, and once reaching the appropriate pressure or temperature, high pressure bypass valve 165 begins to open to allow the heating steam to exit high pressure steam bypass line 160 and to enter reheat steam line 140 and reheater 145. After entering reheater 145, the heating steam will warm the reheater tubes.

Method 300 concludes at block 330 where the heating steam is directed from the reheater to a condenser for collection and reuse. Exemplary system 200 provides one embodiment for directing heating steam from the reheater to a condenser for collection and reuse when isolation valves 129, 147, and 138 are closed. In this configuration, main steam line 130, steam turbine stages 105, 110, and 115, and intermediate pressure steam line 134 are isolated from the heating steam. The heating steam will thus exit reheater 145 when isolation valve 147 is closed, and flow through hot reheat steam bypass line 170. Hot reheat bypass valve 175 opens to allow heating steam into hot reheat steam bypass line 170 and thereafter controls pressure in the line during the warming period. As is understood in the art, the corresponding set point of the pressure control is based on the conditions in the system, such as the line pressure in the hot reheat steam pipe. Once this set point is reached, though, the heating steam travels through reheat steam bypass line 170 and to condenser 120 for collection.

In another exemplary embodiment of a method for pre-warming a HRSG, rather than direct the heating steam from the reheater to a condenser, the heating steam can be used to further warm other steam lines that may be present in the steam turbine or bottoming cycle.

For example, and in reference to exemplary system 200, isolation valves 129 and 147 can be opened so that heating steam can enter and warm main steam line 130 and hot reheat steam line 150. In one embodiment, isolation valve 129 opens gradually so that warming steam will be introduced to main steam line 130 slowly. In this way, abrupt changes in pressure in main steam line 130 can be avoided. In another embodiment, steam flow in main steam line 130 is not so controlled, but is either open or closed. Other embodiments for steam control are also available and should be well recognized in the art.

In another exemplary embodiment of a method for pre-warming a HRSG, the heating steam is used to warm the steam turbines in addition to the steam lines and components.

For example, in exemplary system 200, valves 132 and 152 can be closed so that steam turbine stages 105, 110, and 115 are isolated from the heating steam. Condensate is then collected in drains 131, 146, and 151 for reuse. Alternatively, valves 132, 152, and isolation valve 138 can be opened so that steam turbine stages 105, 110, and 115 can be warmed along with intermediate pressure steam line 134.

As will be appreciated in the art, embodiments for warming these components can vary according to any number of factors. One such factor, for example, is the availability of heating steam. When the quantity of available heating steam is sufficient to warm the entire system, one embodiment can warm some or all of the entire steam turbine or bottoming cycle at once. When the quantity of heating steam is insufficient to warm the entire system at once, though, another embodiment can warm the bottoming cycle in stages. In exemplary system 200, such a multi-phased warming cycle can be accomplished through the opening and closing of valves 132, 152, and isolation valves 129 and 138, or by the closing and opening of other valves so described above and illustrated herein, so that components of the bottoming cycle are warmed in stages.

In another exemplary method, in addition to providing heating steam from a steam source, directing it to a superheater and bypass line, maintaining it in the bypass line until a predefined temperature or pressure is attained, and directing it to a reheater, the heating steam can be further directed to a high pressure section of a steam turbine or bottoming cycle so that the high pressure section can be warmed. One implementation of this operation can be described with reference to exemplary system 200.

In system 200, valve 208 can be opened so that high pressure stage 105 can be warmed. Controller 275 is present for controlling valve 208 so that it opens and closes according to the operation desired. Once so opened, heating steam can flow from steam source 205 through high pressure stage 105 against the operable direction of the turbine. In one embodiment, valve 132 is closed and the heating steam is collected in condenser 120. In another embodiment, valve 132 is opened so that high pressure stage 105 and main steam line 130 are warmed simultaneously.

It will be appreciated that as the heating steam can be further directed to the high pressure stage after warming other components of the bottoming cycle, it can also be directed only to this section. That is, in yet another exemplary method for pre-warming a HRSG, heating steam is directed to a high pressure section of a steam turbine to warm the high pressure section of the steam turbine from a steam source. In exemplary system 200, such a method could be implemented by closing valves 129, 206, and 207, and opening valve 208. With this configuration, heating steam can flow from steam source 205 to high pressure stage 105 and collected in condenser 120.

In another exemplary method for pre-warming a HRSG system, heating steam can be directed so that it warms the high pressure section of the steam turbine and the reheater. In exemplary system 200, such a method can be implemented by closing valves 206, 207, and 165 and opening valve 208 and valve 138. With this configuration, heating steam can flow from steam source 205 to high pressure stage 105 and through non-return valve 133. From there, the heating steam will travel through intermediate pressure steam line 134 through valve 138 to reheat steam line 140 and reheater 145. In one embodiment, the heating steam is directed to warm intermediate pressure stage 110. In another embodiment, the heating steam is collected in condenser 120.

In still another embodiment of a method for pre-warming a HRSG system, heating steam is directed from a steam source to a high pressure evaporator and drum so that the high pressure evaporator and drum can be warmed. In one embodiment, heating steam is directed to the high pressure evaporator and drum only after other components are warmed. In another embodiment, heating steam is directed to the high pressure evaporator and drum before being directed to other components. In still yet another embodiment, heating steam is directed only to the high pressure evaporator and drum so that the high pressure evaporator and drum is warmed in isolation of other components of the bottoming cycle. Again, the preference for one embodiment over another may hinge on whether the quantity of available heating steam is sufficient to warm the entire system or only a part.

System 200 presents an exemplary system for implementing embodiments of this method. To illustrate, the high pressure evaporator and drum 135 can be warmed after other components by opening valve 207 only after those components reach the appropriate temperature. Thus, the functioning of valve 207 can be a function of system temperature, pressure, and/or steam flow from source 205. On the other hand, high pressure evaporator and drum 135 can be warmed first by closing valve 206 and opening valve 207 so that the heating steam can be directed through high pressure evaporator and drum 135 before warming superheater 125. Controller 240 is present for controlling valves 207 and 206 according to these exemplary methods. Although not illustrated, high pressure evaporator and drum 135 can also be warmed in isolation of other components using a suitable valve arrangement that would isolate it from other components in the steam turbine or bottoming cycle. Such valve arrangements are well known within the art.

Thus, the above described methods and systems provide relatively fast start-up capability for HRSG systems because they enable the steam turbine or bottoming cycle to be brought up to operational temperature when the gas turbine or topping cycle is operating at any load. More specifically, they significantly mitigate the stress issues induced by fast start-ups in HRSG systems when those HRSG systems are not at the proper operational temperature for power generation.

Using the disclosed systems and methods, combined cycle power plants can have relatively fast start-up capability no matter their thermo-state condition since the bottoming cycle can be warmed independently of the gas turbine or topping cycle. Once warmed, the steam turbine or bottoming cycle can be operated at a level corresponding to the level of the gas turbine or topping cycle with reduced stresses in the metal parts and components of what would otherwise be a cold steam turbine. As a result, the operational lives of the bottoming cycle's parts and components are preserved or otherwise extended.

This independent warming of the steam turbine or bottoming cycle allows the bottoming cycle to operate at an increased load with reduced stresses in the HRSG and the steam turbines that otherwise would result. In addition, fuel for operating the gas turbine cycle is not wasted as it would be if the gas turbine cycle were required to operate at a low load while the steam turbine or bottoming cycle warmed to its normal operating temperature. With this reduction in wasted fuel, there is also a reduction in emissions.

While the systems and methods described herein make reference to only a single gas turbine and a HRSG system using only a three pressure turbine system, one can appreciate that systems using multiple gas turbines, steam turbines, and HRSG systems can be adapted to employ the systems and methods disclosed and to capitalize on certain aspects disclosed herein.

Many modifications and other embodiments of the inventions set forth herein will also come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for pre-warming a heat recovery steam generator and associated steam lines, the method comprising:
providing heating steam from a steam source to pre-warm the heat recovery steam generator prior to generating steam from the heat recovery steam generator;
directing the heating steam to a superheater of the heat recovery steam generator to warm at least a portion of the superheater;
directing at least a portion of the heating steam from the superheater to at least one bypass line of the heat recovery steam generator;
maintaining the at least a portion of the heating steam from the superheater in the at least one bypass line until a predefined temperature or pressure is attained; and
directing the at least a portion of the heating steam in the at least one bypass line at the predefined temperature or pressure to a reheater of the heat recovery steam generator to warm at least a portion of the reheater.

2. The method of claim 1, further comprising:
directing at least a portion of the heating steam from the superheater to at least one main steam line to warm the at least one main steam line.

3. The method of claim 2, further comprising:
directing at least a portion of the heating steam from the at least one main steam line to a high pressure section of a steam turbine to warm the high pressure section of the steam turbine.

4. The method of claim 3, further comprising:
directing at least a portion of the heating steam from the high pressure section of a steam turbine to at least one intermediate steam line connected to an intermediate pressure section of the steam turbine to warm the at least one intermediate steam line.

5. The method of claim 1, further comprising:
directing at least a portion of the heating steam from the reheater to at least one hot reheat steam line to warm the at least one hot reheat steam line.

6. The method of claim 5, further comprising:
directing at least a portion of the heating steam from the at least one hot reheat steam line to an intermediate pressure section of a steam turbine to warm the intermediate pressure section of the steam turbine; and
directing at least a portion of the heating steam from the intermediate pressure section of the steam turbine to a low pressure section of the steam turbine to warm the low pressure section of the steam turbine.

7. The method of claim 1, further comprising:
directing at least a portion of the heating steam from the steam source to a high pressure section of a steam turbine to warm the high pressure section of the steam turbine.

8. The method of claim 7, further comprising:
directing at least a portion of the heating steam from the steam source to an intermediate steam line; and
directing at least a portion of the heating steam from the intermediate steam line to the reheater to warm at least a portion of the reheater.

9. The method of claim 7, further comprising:
directing at least a portion of the heating steam from the superheater to at least one main steam line to warm the at least one main steam line.

10. The method of claim 1, further comprising:
directing at least a portion of the heating steam from the steam source to a high pressure evaporator and drum to warm the high pressure evaporator and drum.

11. A system for pre-warming a heat recovery steam generator and associated steam lines, the system comprising:
a steam source for providing heating steam to pre-warm the heat recovery steam generator prior to generating steam from the heat recovery steam generator;
at least one steam line connected to the steam source and a superheater of the heat recovery steam generator for directing the heating steam from the steam source to the superheater;
at least one steam line connected to the superheater and at least one bypass line for directing at least a portion of the heating steam from the superheater to the at least one bypass line;
a controller connected to the at least one bypass line for maintaining at least a portion of the heating steam in the at least one bypass line at a predefined temperature or pressure; and
at least one steam line connected to the bypass line and a reheater of the heat recovery steam generator for directing at least a portion of the heating steam at the predefined temperature or pressure to the reheater.

12. The system of claim 11, further comprising:
at least one main steam line connected to the superheater and a high pressure section of a steam turbine; and
a controller connected to the at least one main steam line for maintaining the heating steam in the at least one main steam line at a predefined temperature or pressure.

13. The system of claim 12, further comprising:
at least one intermediate pressure steam line connected to the high pressure section of the steam turbine and an intermediate pressure section of the steam turbine, wherein the at least one intermediate pressure steam line is operable to allow heating steam to flow towards the intermediate pressure section of the steam turbine.

14. The system of claim 11, further comprising:
at least one hot reheat steam line connected to the reheater and an intermediate pressure section of a steam turbine; and
a controller connected to the at least one hot reheat steam line for maintaining the heating steam in the at least one hot reheat steam line at a predefined temperature or pressure.

15. The system of claim 14, further comprising:
at least one low pressure steam line connected to the intermediate section of the steam turbine and a low pressure section of the steam turbine.

16. The system of claim 11, further comprising:
at least one high pressure steam line connected to the steam source and a high pressure section of a steam turbine;
a controller connected to the at least one high pressure steam line for maintaining the heating steam in the at least one high pressure steam line at a predefined temperature or pressure;
at least one intermediate pressure steam line connected to the at least one high pressure steam line and an intermediate pressure section of a steam turbine; and
a controller connected to the at least one intermediate pressure steam line for maintaining the heating steam in the at least one intermediate pressure steam line at a predefined temperature or pressure.

17. The system of claim 16, further comprising:
at least one main steam line connected to the high pressure section of the steam turbine and the superheater; and
a controller connected to the at least one main steam line for maintaining the heating steam in the at least one main steam line at a predefined temperature or pressure.

18. The system of claim 11, further comprising:
at least one steam line connected to the steam source and a high pressure evaporator and drum for directing at least a portion of the heating steam from the steam source to the high pressure evaporator and drum; and
a controller connected to the at least one steam line for maintaining the heating steam in the at least one steam line at a predefined temperature or pressure.

19. A method for pre-warming a heat recovery steam generator and associated steam lines, the method comprising:
providing heating steam from a steam source to pre-warm the heat recovery steam generator prior to generating steam from the heat recovery steam generator;
directing at least a portion of the heating steam into a superheater of the heat recovery steam generator to warm at least a portion of the superheater;
directing at least a portion of the heating steam from the steam source to a high pressure section of a steam turbine associated with the heat recovery steam generator to warm the high pressure section of the steam turbine;
directing at least a portion of the heating steam from the superheater to a reheater of the heat recovery steam generator to warm at least a portion of the reheater;
directing at least a portion of the heating steam from the reheater to an intermediate pressure section of a steam turbine to warm the intermediate pressure section of the steam turbine; and
directing at least a portion of the heating steam from the intermediate pressure section of the steam turbine to a low pressure section of the steam turbine to warm the low pressure section of the steam turbine.

20. The method of claim 19, further comprising:
directing at least a portion of the heating steam from the steam source into a high pressure evaporator and drum to warm the high pressure evaporator and drum.

* * * * *